US012344118B2

(12) United States Patent
Yang

(10) Patent No.: US 12,344,118 B2
(45) Date of Patent: Jul. 1, 2025

(54) CHARGING MANAGEMENT DEVICE, WIRELESS CHARGING SYSTEM, SERVER, AND METHOD FOR PROVIDING WIRELESS CHARGING SERVICES

(71) Applicant: LG ENERGY SOLUTION, LTD., Seoul (KR)

(72) Inventor: Seong Yeol Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 632 days.

(21) Appl. No.: 17/631,248

(22) PCT Filed: Jul. 30, 2020

(86) PCT No.: PCT/KR2020/010094
§ 371 (c)(1),
(2) Date: Jan. 28, 2022

(87) PCT Pub. No.: WO2021/020921
PCT Pub. Date: Feb. 4, 2021

(65) Prior Publication Data
US 2022/0281343 A1   Sep. 8, 2022

(30) Foreign Application Priority Data
Jul. 30, 2019   (KR) ........................ 10-2019-0092312

(51) Int. Cl.
*B60L 53/66* (2019.01)
*B60L 53/12* (2019.01)
(Continued)

(52) U.S. Cl.
CPC ............. *B60L 53/665* (2019.02); *B60L 53/12* (2019.02); *B60L 53/305* (2019.02); *G06Q 30/04* (2013.01);
(Continued)

(58) Field of Classification Search
USPC ........................................................ 320/108
See application file for complete search history.

(56) References Cited

U.S. PATENT DOCUMENTS 5,573,090 A     11/1996  Ross
2012/0146578 A1  6/2012  Krestel
(Continued)

FOREIGN PATENT DOCUMENTS

CN     205304797 U     6/2016
JP     2010-193657 A   9/2010
(Continued)

OTHER PUBLICATIONS

International Search Report (PCT/ISA/210) issued in PCT/KR2020/010094 mailed on Nov. 9, 2020.
(Continued)

*Primary Examiner* — Bryce M Aisaka
(74) *Attorney, Agent, or Firm* — Birch, Stewart, Kolasch & Birch, LLP

(57) ABSTRACT

Discussed are a charging management device, a wireless charging system, a server, and a method for providing wireless charging services. The server is one for managing wireless charging of a vehicle on a road and includes at least one processor, at least one memory that stores computer program instructions that, when executed, cause the at least one processor to perform operations, and a communication device configured to communicate with the vehicle and a charge control device. The operations include receiving, from the vehicle, a traveling route and location information of the vehicle, identifying at least one wireless charging station through which the vehicle passes on the traveling route based on the traveling route and the location information, and providing information on at least one identified wireless charging station to the vehicle.

14 Claims, 13 Drawing Sheets

(51) Int. Cl.
  *B60L 53/30*        (2019.01)
  *G06Q 30/04*        (2012.01)
  *H02J 50/40*        (2016.01)
  *H02J 50/80*        (2016.01)
  *H02J 50/90*        (2016.01)

(52) U.S. Cl.
  CPC .............. *H02J 50/40* (2016.02); *H02J 50/80* (2016.02); *H02J 50/90* (2016.02); *B60L 2240/62* (2013.01); *B60L 2260/22* (2013.01)

(56) References Cited

U.S. PATENT DOCUMENTS

| | | | |
|---|---|---|---|
| 2013/0093393 | A1 | 4/2013 | Shimotani et al. |
| 2013/0154553 | A1 | 6/2013 | Steele |
| 2013/0345945 | A1 | 12/2013 | Fischer et al. |
| 2015/0226572 | A1* | 8/2015 | North ...................... B60L 53/68 701/400 |
| 2015/0354974 | A1 | 12/2015 | Takehara et al. |
| 2018/0238698 | A1* | 8/2018 | Pedersen ............ G01C 21/3476 |
| 2019/0105994 | A1 | 4/2019 | Ahmed et al. |

FOREIGN PATENT DOCUMENTS

| | | |
|---|---|---|
| JP | 2012-126393 A | 7/2012 |
| JP | 2013-38991 A | 2/2013 |
| JP | 2013-64606 A | 4/2013 |
| JP | 5359353 B2 | 12/2013 |
| JP | 2014-45615 A | 3/2014 |
| JP | 2014-193095 A | 10/2014 |
| JP | 2014-240757 A | 12/2014 |
| JP | 2015-230719 A | 12/2015 |
| JP | 5842348 B2 | 1/2016 |
| JP | 2017-143628 A | 8/2017 |
| JP | 6391214 B2 | 9/2018 |
| JP | 2009-8609 A | 4/2025 |
| JP | 2011-34500 A | 4/2025 |
| JP | 2012-160022 A | 4/2025 |
| KR | 10-2013-0119807 A | 11/2013 |
| KR | 10-1466433 B1 | 11/2014 |
| KR | 10-2015-0125849 A | 11/2015 |
| KR | 10-1627798 B1 | 6/2016 |
| KR | 10-2017-0133958 A | 12/2017 |
| KR | 10-2019-0057471 A | 5/2019 |
| KR | 10-2019-0063728 A | 6/2019 |
| WO | WO 2010/137307 A1 | 12/2010 |
| WO | WO 2012/046269 A1 | 4/2012 |

OTHER PUBLICATIONS

Extended European Search Report for European Application No. 20847122.7 dated Jul. 15, 2022.

* cited by examiner

CHARGING MANAGEMENT DEVICE, WIRELESS CHARGING SYSTEM, SERVER, AND METHOD FOR PROVIDING WIRELESS CHARGING SERVICES

CROSS-REFERENCE TO RELATED APPLICATIONS

This application claims the benefit of Korean Patent Application No. 10-2019-0092312, filed on Jul. 30, 2019, in the Korean Intellectual Property Office, the disclosure of which is incorporated herein in its entirety by reference.

TECHNICAL FIELD

Technical Field

The present disclosure relates to a charging management device performing scheduling for charging a vehicle while being at a standstill for waiting for a signal in traveling, a wireless charging system, a server, and a method for providing wireless charging services.

Background Art

In recent years, research and development for secondary batteries have been actively conducted. Here, the secondary battery is a battery capable of recharging and discharging, and in its meaning, includes all of the existing Ni/Cd battery, the Ni/MH battery, and the like and a recent lithium-ion battery. Among secondary batteries, lithium-ion batteries have the advantage of having much higher energy density than the existing Ni/Cd batteries and Ni/MH batteries. In addition, lithium-ion batteries may be manufactured in small size and light weight, and accordingly, may be used as power sources for mobile devices. The lithium-ion batteries are drawing attention as a next-generation energy storage medium as their range of use has expanded to a power source for electric vehicles.

The secondary battery is used as a battery pack that includes a battery module in which a plurality of battery cells are connected in series and/or parallel, and a battery management system (BMS) that controls the operation of the battery module and manages the state of the battery module.

In general, electric vehicles require a lot of energy to improve mileage, and thus battery cells are connected in parallel to increase capacity. Accordingly, shortening the charging time of the battery of the electric vehicle has emerged as an important problem. However, in the related art, there are limitations in that charging of the electric vehicle is possible only when the vehicle is parked in a specific place such as an electric charging station, and it is needed to move to a place where a charger is installed even when charging is urgently required.

DISCLOSURE OF THE INVENTION

Technical Problem

The present disclosure has been made in order to solve the problems described above, and an object thereof is to provide a system and service capable of charging a vehicle that is waiting for a signal in traveling and efficiently managing vehicle charging by scheduling charging time to a destination.

Technical Solution

According to an aspect of embodiments of the present disclosure, there is provided a charging management device managing charging of a vehicle battery, including at least one processor, at least one memory that stores computer program instructions that, when executed, cause the at least one processor to perform operations, a communication device configured to communicate with a server, and a power receiving device configured to receive power wirelessly, wherein the operations include searching for a vehicle traveling route at least based on a destination of a vehicle, identifying wireless charging stations available to make charging while being stopped based on the traveling route, and receiving power from the wireless charging station when stopped in charging available positions at intersections in which the identified wireless charging stations are installed.

In embodiments of the present disclosure, a list of the charge-available wireless charging stations may be received from the server in response to transmitting the traveling route to the server.

In embodiments of the present disclosure, the operations may further include determining a required amount of charge required for charging and transmitting the determined required amount of charge to the server.

In embodiments of the present disclosure, the operations may further include, if power is received from the wireless charging station, updating the required amount of charge based on the received power, and transmitting the updated required amount of charge to the server.

In embodiments of the present disclosure, the operations may further include calculating an estimated arrival time to the charge-available wireless charging station, and transmitting the calculated estimated arrival time to the server.

In embodiments of the present disclosure, the operations may further include transmitting a location of the vehicle to the server.

According to another aspect of embodiments of the present disclosure, there is provided a wireless charging system including a wireless charging station installed under the ground of a road and configured to wirelessly transmit power within a predetermined region, and a charge control device configured to control charging of the wireless charging station, wherein the charge control device includes a communication unit configured to communicate with a server, and a control unit configured to control an operating state of the wireless charging station based on vehicle information received from the server and signal information of traffic lights.

In embodiments of the present disclosure, the vehicle information may include identification information for identifying the vehicle and location information indicating a location of the vehicle.

In embodiments of the present disclosure, the wireless charging station may include a vehicle location determination device configured to determine whether the vehicle is stopped within the predetermined region, a wireless power transmission unit configured to wirelessly transmit power to the vehicle, and a power amount calculation unit configured to calculate an amount of power transmitted by the wireless power transmission unit.

In embodiments of the present disclosure, the charge control device may be configured to receive the amount of power for charging the vehicle from the wireless charging station, and transmit, to the server, the received amount of power in association with the vehicle information.

In embodiments of the present disclosure, the vehicle location determination device may be configured to determine whether the vehicle is stopped at a location in which a power transmission rate is equal to or greater than a reference value if power is wirelessly transmitted to the vehicle.

In embodiments of the present disclosure, the charge control device may be configured to control an operation state of the wireless charging station to switch from a sleep state to a standby state when the signal information of the traffic lights indicates that the vehicle is to be stopped in a traveling direction.

In embodiments of the present disclosure, the charge control device may be configured to control the wireless charging station to stop power transmission before a signal for the traveling direction of the vehicle in the traffic lights is changed from a stop signal to a go signal.

According to another aspect of embodiments of the present disclosure, there is provided a server for managing wireless charging of a vehicle on a road, including at least one processor, at least one memory that stores computer program instructions that, when executed, cause the at least one processor to perform operations, and a communication device configured to communicate with the vehicle and a charge control device, wherein the operations include receiving, from the vehicle, a traveling route and location information of the vehicle, identifying at least one wireless charging station through which the vehicle passes on the traveling route based on the traveling route and the location information, and providing information on at least one identified wireless charging station to the vehicle.

In embodiments of the present disclosure, the operations may further include transmitting information on the vehicle to a corresponding charge control device that controls the at least one identified wireless charging station.

In embodiments of the present disclosure, the operations may further include receiving, from the charge control device, an amount of power charged in the vehicle in association with the information on the vehicle, and generating billing information for the vehicle based on the received amount of power.

In embodiments of the present disclosure, the generating of the billing information may be performed based on a sum of all the amount of power received by the vehicle on the traveling route.

According to another aspect of embodiments of the present disclosure, there is provided a method for providing wireless charging services for wirelessly charging a vehicle while the vehicle is at a standstill by using a plurality of wireless charging stations provided under the ground of a road, including confirming, at a server, at least one wireless charging station available to make charging, among the plurality of wireless charging stations, based on a traveling route of the vehicle, transmitting power from the wireless charging station to the vehicle if the vehicle is stopped in a charging available position at an intersection in which the at least one wireless charging station is installed, and generating billing information based on an amount of power transmitted to the vehicle.

In embodiments of the present disclosure, the method may further include receiving payment method information from the vehicle, and transmitting payment information to a payment server based on the payment method information and the billing information.

In embodiments of the present disclosure, the billing information may be generated based on vehicle information recognized by identifying a license plate of the vehicle.

Advantageous Effects

With the configuration described above, the system and service according to the embodiments of the present disclosure may charge a vehicle that is waiting for a signal in traveling and may efficiently manage vehicle charging by scheduling charging time to a destination.

MODE FOR CARRYING OUT THE INVENTION

Figure 1:
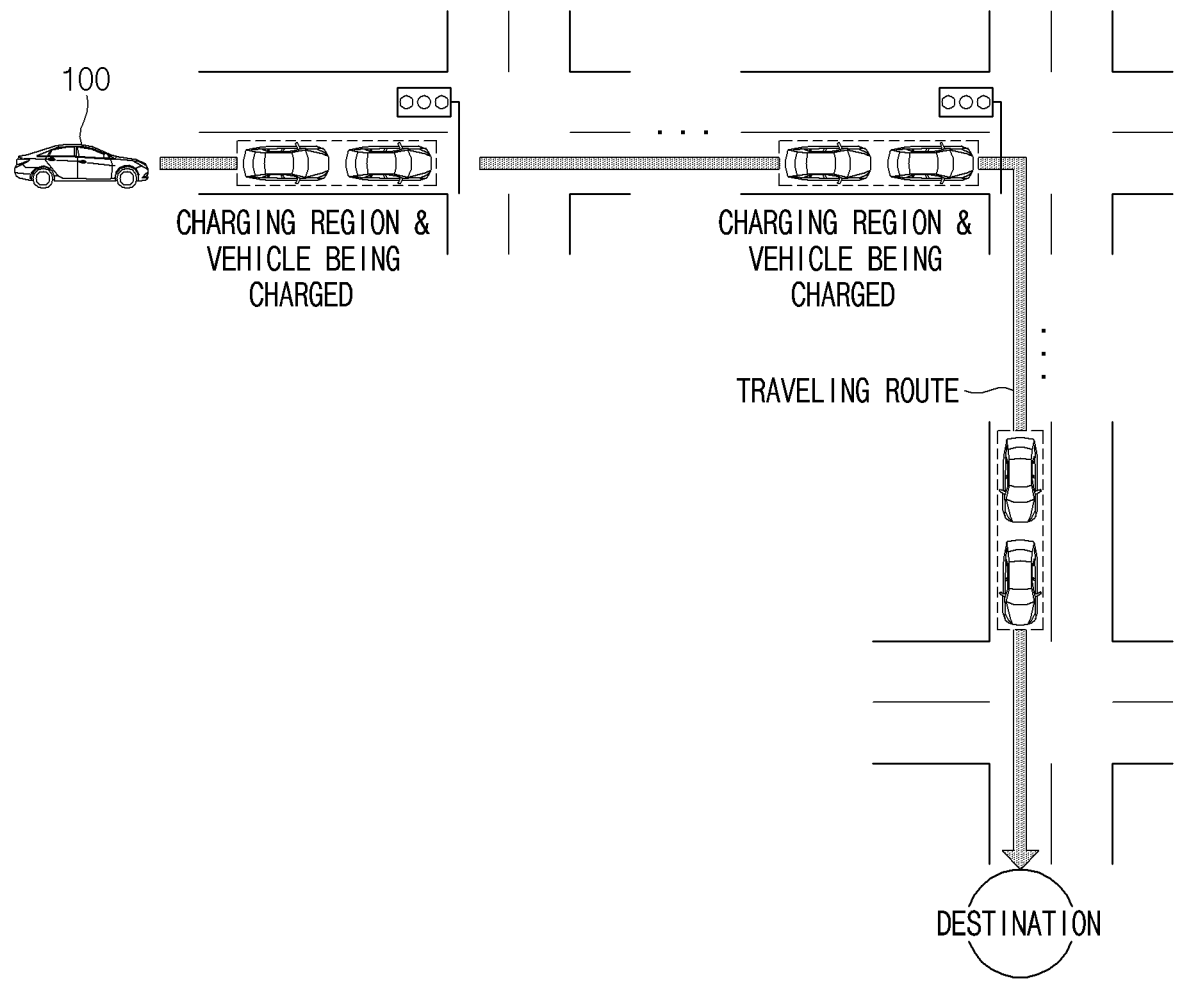
FIG. 1 is a diagram schematically illustrating a situation in which the present disclosure is applied.

Hereinafter, various embodiments of the present disclosure will be described in detail with reference to the accompanying drawings. In the present disclosure, the same reference numerals are used for the same elements in the drawings, and duplicate descriptions for the same elements are omitted.

In various embodiments of the present disclosure disclosed herein, specific structural or functional descriptions are merely by example for the purpose of describing embodiments of the present disclosure, and various embodiments of the present disclosure may be implemented in various forms and should not be construed as being limited to the embodiments described herein.

As used in various embodiments, the terms such as "first", "second", "the first", or "the second" may modify various components, regardless of order and/or importance, but do not limit the components. For example, without departing from the scope of the present disclosure, a first element could be termed a second element, and similarly, in reverse, a second element could be termed a first element.

The terms and phrases as used herein are merely provided to describe specific embodiments, and may not be intended to limit the scope of other embodiments. A singular form is intended to include a plural form, unless the context clearly indicates otherwise.

FIG. 1 is a diagram schematically illustrating a situation in which the present disclosure is applied.

A vehicle stops to wait for the go signal if a signal of traffic lights related to a traveling direction at an intersection or the like is the stop signal. The length of the stop signal and the like of the traffic lights is determined by a signal controller controlling each traffic light. Therefore, it is possible to calculate the approximate time for the vehicle to be at a standstill at the intersection by the stop signal. Embodiments of the present disclosure are made based on the above idea.

In the system and service according to embodiments of the present disclosure, a wireless charging station capable of wirelessly charging a vehicle's battery may be installed in a region or a location where the vehicle is stopped in order to wait for a signal at an intersection. If the vehicle is completely stopped within the chargeable region, wireless charging may be performed by the request of a user (driver) or according to a vehicle setting. The period in which the stop signal and the go signal are repeated is predetermined for the signals of the traffic lights at each intersection. Therefore, if a route to the destination of the vehicle is derived, the signal period at each intersection on the derived route may be used to calculate at which point the vehicle will stop for waiting for a signal, how long it will be at a standstill, and so on. As a result, it is possible to calculate the total charging time to be performed while the vehicle is traveling to its destination. Here, the stop signal may be a concept including a signal other than the go signal in a direction in which the vehicle is traveling. For example, if the vehicle intends to go straight at an intersection, a signal indicating that the vehicle should not go in the traveling direction, such as a left turn signal, may be included.

Referring to FIG. 1, a traveling route for a vehicle 100 to move to a destination is indicated by a thick arrow. The traveling route may be a result of searching by a navigation provided in the vehicle 100, a navigation application installed on a user device (smartphone, tablet, or the like) possessed by a user of the vehicle 100, and the like, based on the destination input by the user. Alternatively, the traveling route may be a result of searching by the server based on information related to the current location and destination provided from the vehicle 100 to a server such as a charging management server.

On the traveling route, there are a plurality of intersections through which the vehicle 100 will pass. At each intersection, a chargeable region capable of wireless charging is provided in a predetermined region or location. In some cases, there may be no vehicle waiting for a signal in the chargeable region. Depending on the traffic conditions, there may be many moving vehicles, and other vehicles may be at a standstill in some or the entire chargeable region. Accordingly, charging may be performed if the vehicle 100 stops in the chargeable region and power transmission is possible from the wireless charging station installed in the chargeable region to the vehicle 100 at a power transmission rate equal to or greater than the reference value.

The vehicle 100 may be an electric vehicle. Therefore, the vehicle 100 may use a motor to generate power, and may include a battery for driving the motor. The battery may be a secondary battery capable of charging and discharging, and a sufficient amount of power is to be charged for the vehicle 100 to move to the destination. Depending on the state of charge (SOC) of the battery provided in the vehicle 100, the battery of vehicle 100 may be required to be charged in traveling. In some cases, if the battery is not in a fully charged state, it may be desired to always charge the battery of the vehicle 100 just in case. In other cases, it may be desired to charge the battery of the vehicle 100 only in the minimum amount required to its destination in terms of charging cost. For example, if the destination is home or a place where charging is possible at a lower price than a wireless charging station, such as inexpensive charging stations, it may be desired to perform charging only in the minimum amount.

When the vehicle 100 is waiting for a signal by the stop signal or the like at an intersection, determination is made as to whether or not it is in a chargeable state. The chargeable state may be, for example, a state in which the power transmission rate is equal to or greater than a reference value. That is, the chargeable state may be a state in which wireless charging efficiency is equal to or greater than a reference value. The wireless charging efficiency may be determined by various factors such as a relative location between a location where the vehicle 100 is stopped and the charging region, a condition of the battery installed in the vehicle 100, weather, and surrounding environment.

When the vehicle 100 is in a chargeable state, charging is performed if a predetermined condition is met. The predetermined condition may be a case where a charging execution request is transmitted from the vehicle 100 to a wireless charging station, a charge control device including the wireless charging station, or a server that manages charging. The charging execution request may be transmitted by a user to a related device (such as a server described above) through the vehicle 100 or a user device immediately before or during traveling. Alternatively, the charging execution request may be automatically transmitted whenever the user starts traveling by subscribing to the wireless charging service in advance. Alternatively, the charging execution request may be transmitted by the user to a wireless charging station installed at an intersection or a charge control device including the wireless charging station when the vehicle 100 stops at the intersection. The transmission method for the charging execution request is by example and is not limited thereto.

In addition, before starting charging in response to the charging request signal, a request for charging execution confirmation may be transmitted to the user. Charging may be started only if the user accepts the request for charging execution confirmation and instructs that charging should be executed. However, this is illustrative, and if the charging execution request is transmitted by the user, and the condition that the vehicle 100 should be stopped at a location of the chargeable region having a wireless charging efficiency equal to or greater than the reference value is satisfied, charging may be automatically performed.

As described above, the vehicle 100 may be put into a situation of waiting for a signal in traveling to a destination, and if the stop region during signal waiting corresponds to a chargeable region, the battery may be charged at any time during the signal waiting stop.

Hereinafter, a method for performing wireless charging of the vehicle 100 in a chargeable region will be described in detail. In other words, a method for providing a wireless charging service to the vehicle 100 will be described.

Figure 2:
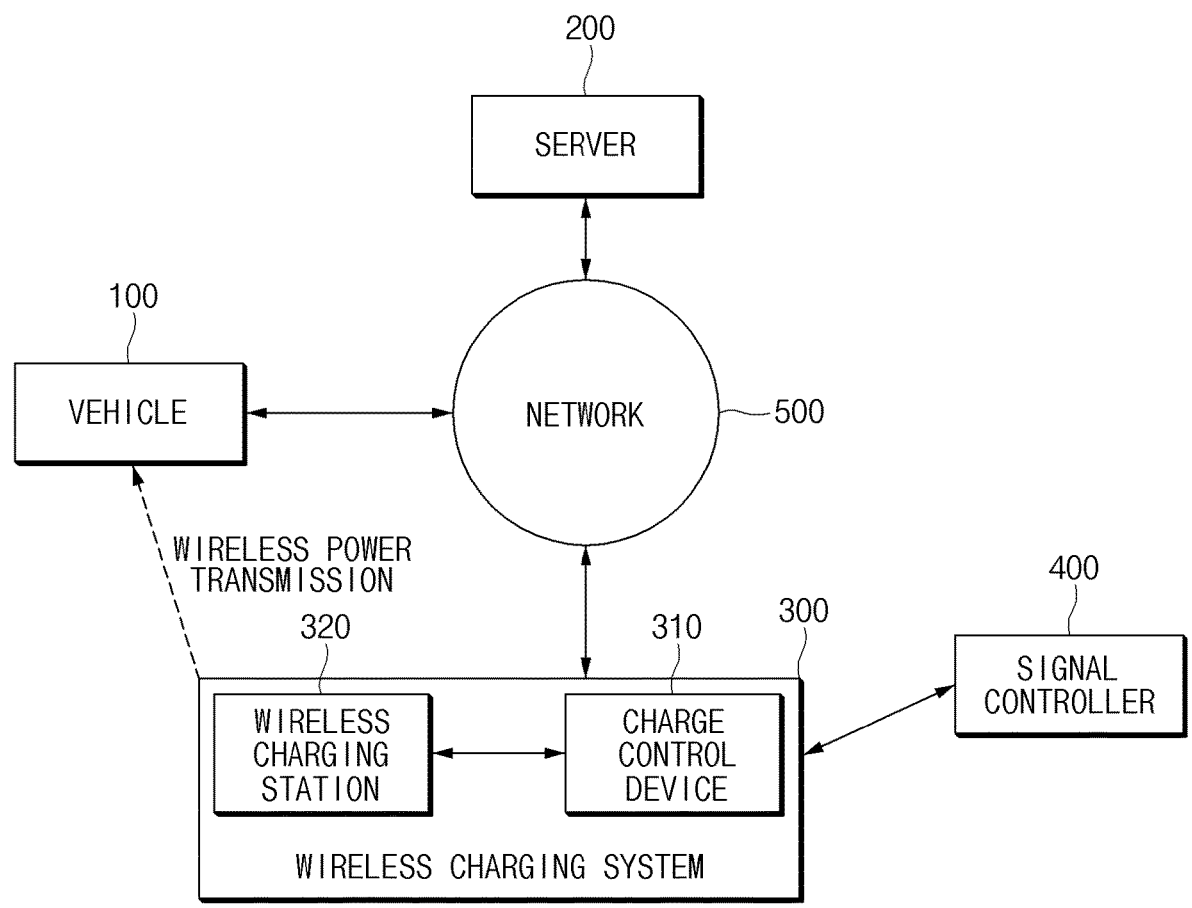
FIG. 2 is a diagram illustrating a configuration of a system according to embodiments of the present disclosure.

FIG. 2 is a diagram illustrating a configuration of a system according to embodiments of the present disclosure.

A system according to embodiments of the present disclosure may include the vehicle 100, a server 200, and a wireless charging system 300.

The vehicle 100 may be an electric vehicle that moves by driving a motor with a battery, as described above in FIG. 1. The battery is a rechargeable secondary battery. The vehicle 100 may include a wireless charging circuit in order to wirelessly charge the mounted battery.

The vehicle 100 may include a charging management device that manages charging of the battery. The charging management device searches for a vehicle traveling route at least based on a destination of the vehicle, and confirms wireless charging stations 320 that are charge-available while being at a standstill based on the traveling route. The charging management device may receive power from the wireless charging stations 320 if the vehicle is stopped in chargeable locations at intersections in which the confirmed wireless charging stations 320 are installed.

The vehicle 100 may communicate with the server 200 and the wireless charging system 300 through a network 500. The vehicle 100 may be connected to the network 500 using an in-vehicle connectivity system. Alternatively, the vehicle 100 may be connected to the network 500 through a communication unit provided separately from the in-vehicle connectivity system. In addition, the vehicle 100 may be connected to the network 500 in a method other than a method using a communication unit of the vehicle itself. For example, the vehicle 100 may be connected to the network 500 through the mobile device of the user. Alternatively, instead of the vehicle 100 being connected to the network 500, the mobile device of the user may be connected to the network 500 to perform various operations to be described below.

The charging management device of the vehicle 100 may receive a list of charge-available wireless charging stations 320 from the server 200 in response to transmitting the traveling route to the server 200. Additionally, the charging management device of the vehicle 100 may determine a required amount of charge required to be charged, and may transmit, to the server 200, the determined required amount of charge. In this case, if the vehicle 100 receives power from the wireless charging station 320, an operation of updating the required amount of charge based on the received power, and transmitting the updated required amount of charge to the server 200 may be further included.

The charging management device of the vehicle 100 may further include operations of calculating an estimated arrival time to the charge-available wireless charging station 320, and transmitting the calculated estimated arrival time to the server 200. The charging management device of the vehicle 100 may further include an operation of transmitting a location of the vehicle to the server 200 in real time.

The server 200 may be a charging management server for implementing a wireless charging service according to embodiments of the present disclosure. That is, the server 200 may be a server for managing wireless charging of a vehicle on a road.

The server 200 may receive various information and signals from the vehicle 100. The server 200 may receive information on the traveling route or information on the current location and destination from the vehicle 100. The server 200 may receive a charging execution request from the vehicle 100. The charging execution request may be transmitted from the vehicle 100 immediately before traveling of the vehicle 100. Alternatively, the charging execution request may be a signal generated based on the user of the vehicle 100 subscribing to the wireless charging service in advance.

The server 200 may identify at least one wireless charging station 320 through which the vehicle 100 passes on the traveling route of the vehicle 100 based on the information on the traveling route and the current location. In this case, the server 200 may confirm wireless charging stations 320 on the traveling route based on the information on the traveling route received from the vehicle 100 or based on the information on the traveling route calculated based on the information on the current location and destination received from the vehicle 100.

The server 200 may transmit information on at least one identified wireless charging station 320 to the vehicle 100 and/or the corresponding charge control device 310 that controls the wireless charging station 320. The server 200 may directly transmit information on the vehicle to the wireless charging station 320 instead of the charge control device 310. For example, the server 200 may transmit a list of at least one wireless charging station 320 to the vehicle 100 and/or the charge control device 310.

The server 200 may receive the amount of power charged in the battery of the vehicle 100 from the charge control device 310 in association with the information on the vehicle 100. The server 200 may generate billing information for the vehicle based on the received amount of power. In this case, the billing information may be generated based on the sum of all amounts of power received by the vehicle 100 on the traveling route. The server 200 may transmit the billing information to a payment server of a credit card company or the like to charge the electricity bill corresponding to the amount of power used to charge the battery of the vehicle 100. In order to charge the electricity bill, the server 200 may transmit, to the payment server, payment method information (e.g., credit card information) received from the user together with billing information.

The server 200 may communicate with the charging management device (or user device) of the vehicle 100 and the wireless charging system 300 through the network 500.

The wireless charging system 300 is a system configured to enable wireless charging by wirelessly transmitting power to the battery of the vehicle 100. The wireless charging system 300 may include the charge control device 310 and the wireless charging station 320.

The wireless charging station 320 is a device installed under the ground of a road and configured to wirelessly transmit power within a predetermined region. The wireless charging station 320 may determine whether the vehicle 100 is stopped in a predetermined region. For example, the wireless charging station 320 may determine whether the vehicle 100 is stopped at a location in which a power transmission rate is equal to or greater than a reference value if power is wirelessly transmitted to the battery of the vehicle 100. That is, determination may be made as to whether the wireless charging efficiency of the battery of the vehicle 100 by the wireless charging station 320 is equal to or greater than a reference value. If it is determined that the vehicle 100 is stopped in the predetermined region, the wireless charging station 320 may wirelessly transmit power to the battery of the vehicle 100.

The wireless charging station 320 may perform power transmission under the control of the charge control device 310. In addition, the wireless charging station 320 may calculate the amount of power transmitted to the vehicle 100 and transmit the calculated amount of power to the charge control device 310.

The charge control device 310 is a device configured to control the charging operation of the wireless charging station 320. The charge control device 310 may be configured to control an operating state of the wireless charging station 320 based on vehicle information received from the server 200 and signal information of traffic lights. The vehicle information may include identification information for identifying the vehicle 100 and location information indicating the location of the vehicle 100.

The charge control device 310 may be configured to communicate with the server 200 to receive the amount of power charged in the battery of the vehicle 100 from the wireless charging station 320, and transmit the received amount of power to the server 200. When transmitting the amount of power to the server 200, the charge control device 310 may transmit it in association with vehicle information.

The charge control device 310 may be configured to control an operation state of the wireless charging station 320 to switch from a sleep state to a standby state when the signal information of the traffic lights indicates that the vehicle 100 is to be stopped in a traveling direction. In addition, the charge control device 310 may be configured to control the wireless charging station 320 to stop power transmission before a signal for the vehicle traveling direction in the traffic lights is changed from a stop signal to a go signal.

The wireless charging system 300 may communicate with the charging management device (or user device) of the vehicle 100 and the server 200 through the network 500.

A signal controller 400 controls signals of traffic lights installed on roads such as intersections. The signal controller 400 may transmit signal information of the traffic lights to the wireless charging system 300. The signal information may include a variety of information to determine signal states of the traffic lights, such as the current signal, the next signal, and the lengths of respective signals of the traffic lights.

In the present embodiment, the signal controller 400 has been illustrated as being directly connected to the wireless charging system 300 without going through the network 500, but the present disclosure is not limited thereto. That is, the signal controller 400 may be connected to the wireless charging system 300 through the network 500. Furthermore, although not illustrated, the signal controller 400 may be connected to a traffic control center or the like through the network 500 to control or monitor the operation.

The network 500 connects respective components in the system with each other to enable wireless and/or wired communication. The network 500 may be implemented by various methods in which respective components may be communicatively connected, and is not limited to a specific method.

Figure 3:
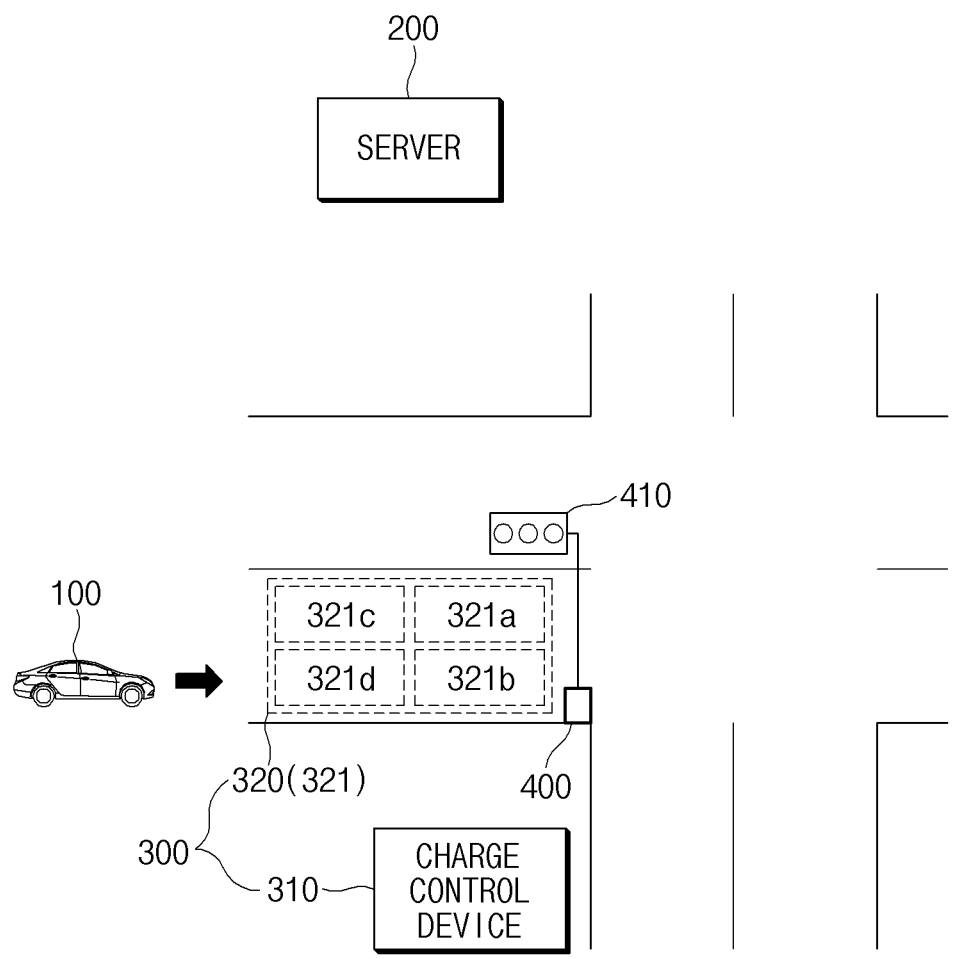
FIG. 3 is a diagram illustrating a situation in which a system according to embodiments of the present disclosure operates.

FIG. 3 is a diagram illustrating a situation in which a system according to embodiments of the present disclosure operates. FIG. 3 illustrates in detail the situation of a specific intersection in the situation illustrated in FIG. 1.

As described above, the system may include the vehicle 100, the server 200, and the wireless charging system 300.

At the intersection, the wireless charging station 320 having a chargeable region 321 and the charge control device 310 for controlling the wireless charging station 320 may be provided. The chargeable region 321 may have a plurality of chargeable sub-regions 321a to 321d. In FIG. 3, the chargeable region 321 is illustrated as having four chargeable sub-regions 321a to 321d; however, this is by example and is not limited thereto. The chargeable region 321 may have less than four chargeable sub-regions depending on road conditions, and may have five or more chargeable sub-regions.

If the vehicle 100 is stopped to be completely covered by any one of the plurality of chargeable sub-regions 321a to 321d, the wireless charging efficiency will be higher than a reference value. Accordingly, the battery of the vehicle 100 will be charged through a wireless power transmission unit provided in the wireless charging station 320. On the other hand, if the vehicle 100 is stopped over a part of any one of the plurality of chargeable sub-regions 321a to 321d, wireless charging efficiency is determined according to information such as a relative location between the wireless charging unit provided in the vehicle 100 and the wireless power transmitting unit of the chargeable sub-region. Then, if the determined wireless charging efficiency is equal to or greater than a reference value, the battery of the vehicle 100 is charged.

The server 200 may receive information such as traveling speed and current location information from the vehicle 100 in real time. In addition, the server 200 may further receive information on a battery state of charge (SOC), destination information, or the like, in addition to the information listed above. The above-described information received by the server 200 may be transmitted to the charge control device 310. Alternatively, the above-described information may be transmitted directly from the vehicle 100 to the charge control device 310.

The server 200 searches for a route to the destination of the vehicle 100 using the current location information and destination information received from the vehicle 100. However, this is by example, and as described above, a traveling route may be searched for in a navigation system of the vehicle 100, a navigation application of the user device, or the like. The charge control device 310 may receive the traveling route determined according to the searching result directly from the vehicle 100 or through the server 200.

The server 200 identifies the wireless charging station 320 that is charge-available among the routes to the destination of the vehicle 100. The server 200 transmits information on the vehicle 100, such as the above-described current location information, traveling route, and traveling speed, to the corresponding charge control device 310 controlling the identified wireless charging station 320.

The charge control device 310 of the wireless charging system 300 receiving information on the vehicle 100 from the server 200 receives signal information from the signal controller 400. The signal information may include a variety of information to determine signal states of the traffic lights, such as the current signal, the next signal, the lengths of respective signals, and the period of the signals of the traffic lights. The signal information may be provided by the signal controller 400 in response to a request of the charge control device 310. Alternatively, the signal information may be transmitted and stored periodically or in advance from the signal controller 400 to the charge control device 310, irrespective of the request of the charge control device 310. In this case, the charge control device 310 may be configured to receive an updated content only if the signal period or the like is changed (for example, if the signal is changed to a yellow blinking signal at night).

The charge control device 310 uses the distance from the current location of the vehicle 100 to the chargeable region 321 of the wireless charging station 320 and the traveling speed of the vehicle 100 to calculate the time it takes for the vehicle to arrive at the chargeable region 321. The equation for calculating the time it takes for the vehicle 100 to arrive at the chargeable region 321 is as shown in Equation (1) below:

$$T_{arrival(i)} = \frac{D_{i-1}}{V_{current}} \quad (1)$$

where Di-1 is the distance from the current location to the chargeable region.

Subsequently, the charge control device 310 uses a stop-go signal period in the chargeable region 321 and the time it takes to arrive at the chargeable region 321 to calculate a stop time when the vehicle 100 arrives at the corresponding chargeable region 321. An equation for calculating the stop time when the vehicle 100 arrives at the corresponding chargeable region 321 is as shown in Equation (2) below:

$$T_{remaind\_stop\_signal} = T_{current\_stop\_signal} - [T_{arrival(i)} \bmod T_{(Red,Green)}] \quad (2)$$

where $T_{(Red, Green)}$ is the stop-go signal period, and $T_{current\_stop\_signal}$ is the time remaining until the next go signal (mod is a modulo function that takes the remainder of division as a result).

That is, the remaining stop time is calculated by subtracting the time when the vehicle has arrived at the current intersection from the time remaining until the go signal at the intersection. At this time, $T_{remain\_stop\_signal} \leq T(Red)$ (T(Red) is the length of a vehicle-stop signal).

In applying Equation (2) above, the $T_{current\_stop\_signal}$ value may be appropriately adjusted. For example, it is assumed that at a crossroad, the signal period of traffic lights is 2 minutes (that is, $T_{(Red, Green)}$ is 2 minutes), a straight-ahead signal, which is the go signal, is 45 seconds, a left turn signal and a stop signal, which are vehicle-stop signals, are 15 seconds and 1 minute, respectively (the total length of the stop signal is 1 minute and 15 seconds). At this time, if the result value of $[T_{arrival(i)} \bmod T_{(Red,Green)}]$ is 10 seconds and $T_{current\_stop\_signal}$ is 50 seconds (25 seconds elapsed after the signal of the traffic lights is turned to the stop signal), $T_{remain\_stop\_signal}$ is 40 seconds. On the other hand, if the result value of $[T_{arrival(i)} \bmod T_{(Red,Green)}]$ is 40 seconds and $T_{current\_stop\_signal}$ is 30 seconds (45 seconds elapsed after the signal of the traffic lights is turned to the stop signal), $T_{remain\_stop\_signal}$ is −10 seconds. That is, the vehicle arrives at the crossroad after the stop signal has changed to the go signal, and thus charging is not possible. For another example, a case where the current signal of the traffic lights is the go signal may be considered. In this case, calculation is performed using the length of the current remaining go signal as the $T_{current\_stop\_signal}$ value. If the result value is positive, charging is not possible since the go signal remains when the vehicle arrives at the crossroad. If the result value is negative, the signal is the stop signal when the vehicle arrives at the crossroad, and thus the value obtained by adding the result value to the total length of the stop signal may be set as $T_{remain\_stop\_signal}$ (that is, the same as $T_{current\_stop\_signal}$ set by adding the total length of the stop signal to the length of the remaining go signal in the calculation of Equation (2)). As described above, when performing the calculation of Equation (2), the value of $T_{current\_stop\_signal}$ may be appropriately adjusted depending on the current signal type of the traffic lights, the remaining time of the signal, and the result value of $[T_{arrival(i)} \bmod T_{(Red, Green)}]$.

Subsequently, the charge control device 310 uses the stop time when the vehicle 100 arrives at the chargeable region 321 and the time when vehicles currently in the chargeable region 321 get out of the chargeable region 321 to calculate an estimated charging time of the vehicle 100 in the chargeable region 321. The equation for calculating the estimated charging time of the vehicle 100 in the chargeable region 321 is as shown in Equation (3) below:

$$T_{charge(i)} = T_{remain\_stop\_signal} - T_{leave} \quad (3)$$

When being utilized, Equation (3) described above should be appropriately adjusted and changed depending on road conditions. This is because if a large number of vehicles are at a standstill at the intersection, the vehicle 100 of the user may be stopped outside the chargeable region 321 and may pass through the chargeable region 321 with other vehicles that have been stopped at the time of the go signal. On the other hand, there will be a case where another vehicle that has been stopped passes at the go signal and the vehicle 100 of the user fails to pass through the intersection at the corresponding signal and is stopped again in the chargeable region 321. In this case, the above Equation (3) could be utilized.

Therefore, the charge control device 310 is to use Equation (3) in comprehensive consideration of the current road conditions, the average number of vehicles that have been stopped passing through the intersection at the time of the go signal, a pedestrian situation, or the like.

Subsequently, the server 200 receives the estimated charging time calculated from each charge control device 310. Then, the server 200 calculates the total available charging time by summing all of the estimated charging times received from all charge control devices 310 on the traveling route to the destination of the vehicle 100. The equation for calculating the total available charging time is as shown in Equation (4) below:

$$T_{charge\_total} = \sum_{i=1}^{N} T_{charge(i)} \quad (4)$$

The server 200 may derive a charge amount that may be used for charging while the vehicle 100 is going to the destination based on the calculated total charging time, and transmit it to the vehicle 100. In addition, the server 200 may transmit the total available charging time to the vehicle 100. Alternatively, in addition to the amount of charge that is charge-available and the total available charging time, the server 200 may separately transmit the chargeable amount of charge and the estimated charging time for each wireless charging station 320 identified and provided as being charge-available to the vehicle 100 in traveling.

Information, such as the estimated charging time, the chargeable amount of charge, and the total available charging time, may be updated in real time by reflecting the current location information that is changed as the vehicle 100 travels. In addition, if the vehicle 100 performs charging in the chargeable region 321 of a specific wireless charging station 320 or passes the corresponding chargeable region 321, by reflecting it, the information such as the estimated charging time, the chargeable amount of charge, and the total available charging time may be updated.

In the embodiment according to the present disclosure, it has been described that the server 200 serves as a medium for exchanging information between the vehicle 100 and the charge control device 310, and the charge control device 310 calculates the estimated charging time and chargeable amount of charge; however, the present disclosure is not limited thereto. For example, the server 200 may receive corresponding signal information from the charge control devices 310 to directly calculate the estimated charging time and the chargeable amount of charge. Alternatively, the vehicle 100 may directly exchange information with the charge control device 310 to perform all of the above-described functions, and the server 200 may be omitted.

Hereinafter, a detailed configuration and function of each component of a system according to the present disclosure will be described.

Figure 4:
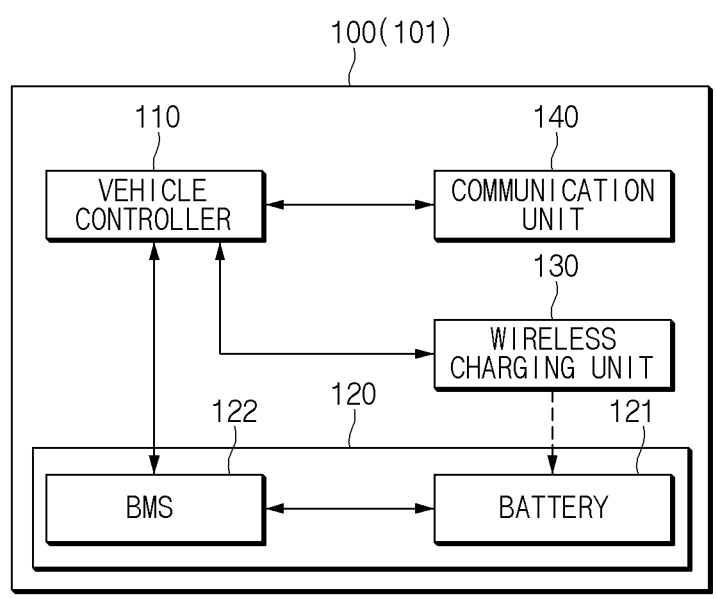
FIG. 4 is a block diagram illustrating a functional configuration of a charging management device according to embodiments of the present disclosure.

FIG. 4 is a block diagram illustrating a functional configuration of a charging management device according to embodiments of the present disclosure.

Referring to FIG. 4, the vehicle 100 may include a vehicle controller 110, a battery pack 120, a wireless charging unit 130, and a communication unit 140.

The vehicle controller 110 controls the operation of various devices provided inside the vehicle 100. The vehicle controller 110 may operate as a host controller of a battery management system (BMS) 122 provided in the battery pack 120. The vehicle controller 110 may be communicatively connected with the BMS 122 to control the charging and discharging of the battery module 121 by controlling the BMS 122 and monitor the state of the battery module 121.

The battery pack 120 may be made of one or more battery cells, and may include the battery module 121 which is capable of performing charging and discharging, and the BMS 122 that performs control such that overcharging, overdischarging, and the like are prevented by monitoring the voltage, current, temperature, or the like of the battery cell and/or the battery module 121. In addition, although not illustrated, the battery pack 120 may further include a switching circuit for controlling the charge/discharge current flow of the battery module 121 and a battery protection unit (BPU) for protecting the battery pack 120 when an abnormality occurs in the battery pack 120.

The battery module 121 includes one or more battery cells capable of charging and discharging. In the battery module 121, a plurality of battery cells may be connected in series and/or in parallel to each other depending on the required specifications of the battery pack 120. That is, the number and connection type of battery cells may be determined depending on the required output (voltage, current, or the like) of the battery pack 120. The battery cell may be a lithium ion (Li-ion) battery, a lithium ion polymer battery, a nickel cadmium (Ni—Cd) battery, a nickel hydrogen (Ni-MH) battery, or the like, and is not limited thereto as long as the battery is a rechargeable battery.

The BMS 122 controls and manages the overall operation of the battery pack 120. The BMS 122 may control the operation of the switching circuit in order to control the charging/discharging operation of the battery module 121. In addition, the BMS 122 may monitor the voltage, current, temperature, and the like of each battery cell included in the battery module 121 and/or the battery module 121. In addition, for monitoring by the BMS 122, a sensor or various measurement modules, which are not illustrated, may be additionally installed in any location such as the battery module 121, the charge/discharge path, or the battery pack 120. The BMS 122 may calculate a parameter indicating the state of the battery module 121, for example, SOC or SOH, based on measurement values such as the monitored voltage, current, and temperature.

The battery pack 120 may be communicatively connected with the vehicle controller 110, which is a host controller. That is, the BMS 122 may transmit various data on the battery pack 120 to the vehicle controller 110, and may receive a control signal regarding the operation of the battery pack 120 from the vehicle controller 110.

The communication unit 140 is a device configured to communicate with an external device. The communication unit 140 may exchange information by communicating with the server 200 functioning as a charging management server through the network 500. For example, the communication unit 140 may transmit, to the server 200, information on the battery module 121 transmitted from the BMS 122 to the vehicle controller 110, for example, information such as SOC. In addition, the communication unit 140 may transmit, to the server 200, information such as the charging execution request generated based on the input or setting of the user, a current location, the traveling route, and the traveling speed of the vehicle 100.

The wireless charging unit 130 is a power receiving device configured to receive power wirelessly transmitted from the outside. The wireless charging unit 130 receives power from a power transmission unit of the wireless charging station 320 if the vehicle 100 is stopped in the chargeable region 321 provided in the wireless charging station 320 of the wireless charging system 300. The wireless charging unit 130 may charge the battery module 121 using the received power.

Figure 5:
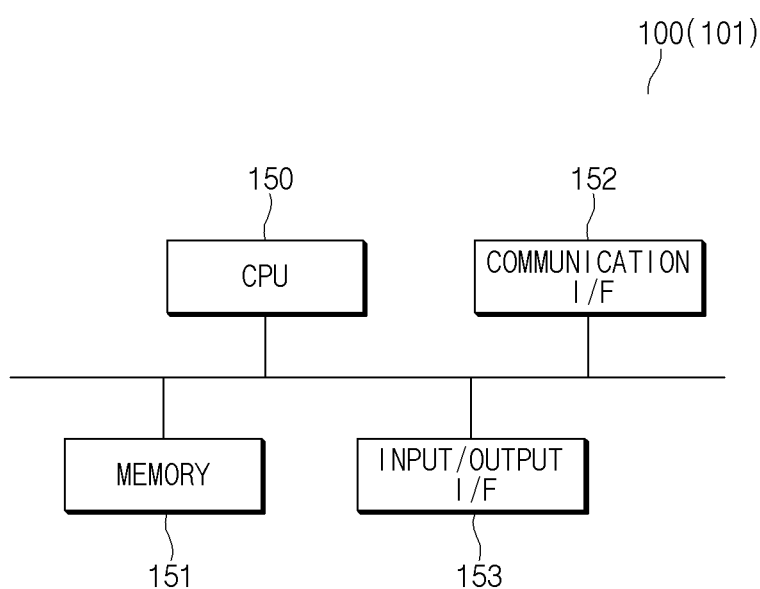
FIG. 5 is a block diagram illustrating a hardware configuration of the charging management device according to embodiments of the present disclosure.

FIG. 5 is a block diagram illustrating a hardware configuration of the charging management device according to embodiments of the present disclosure.

The charging management device 101 of the vehicle 100 including the vehicle controller 110, the battery pack 120, the wireless charging unit 130, and the communication unit 140 may include at least one processor, at least one memory, a communication device, and a power receiving device in terms of hardware.

Referring to FIG. 5, the charging management device 101 may include a processor (CPU) 150, a memory 151, a communication interface 152, an input/output interface 153, and the like.

The processor 150 is the at least one processor described above, and may be any of various controllers capable of performing an operation by executing computer program instructions such as a CPU, MCU, microcontroller, or microprocessor. The processor 150 may process various operations and arithmetic operations in the charging management device 101 and may control each component.

The memory 151 may store an operating system program and a computer program for performing functions of the vehicle controller 110. The memory 151 may include a volatile memory and a nonvolatile memory. For example, the memory 151 may be at least one of various storage media such as a semiconductor memory, for example, RAM, ROM, and flash memory, a magnetic disk, and an optical disk. The memory 151 may be a memory built into the processor 150 or may be an additional memory installed separately from the processor 150.

The communication interface 152 is configured to communicate with the outside by wire and/or wirelessly.

The input/output interface 153 performs input/output of various input signals and output signals. For example, the processor 150 included in the charging management device 101 may receive signals from various sensors through the input/output interface 153. The input/output interface 153 may further include an input device configured to receive an input from the user, and an output device such as a display for displaying various signals or information generated by the charging management device 101. In addition, in the charging management device 101 according to the present disclosure, a device for a wireless charging circuit through which power is received may be included as the input/output interface 153.

The processor 150 may implement a module that performs various functions of the charging management device 101 by executing a program stored in the memory 151. The processor 150 may operate together with the communication interface 152 to function as the communication unit 140. In addition, the processor 150 may operate together with the input/output interface 153 to function as the wireless charging unit 130.

Specifically, the processor 150 as at least one processor executes computer program instructions stored in the memory 151 to perform operations for charging management. Specifically, the traveling route of the vehicle 100 to the destination is searched for based on the destination information input by the user and the current information of the vehicle 100. There may be a plurality of traveling routes to be searched for. For example, there may be a plurality of traveling routes to be searched for according to conditions such as the optimum road, a free road, a highway priority, the shortest distance, and the minimum time. The searching for the traveling route may be performed by a navigation system built in the vehicle 100 or a navigation application installed in a user device. One of the plurality of traveling routes searched may be determined as a traveling route on which the vehicle 100 travels.

If the processor 150 transmits information on the traveling route to the server 200, the server 200 identifies wireless charging stations 320 that are charge-available to the vehicle 100 while being at a standstill from the server 200. Alternatively, the processor 150 may transmit information on the current location and destination of the vehicle 100 to the server 200, the server 200 directly searches for the traveling route, and then the vehicle 100 may identify wireless charging stations 320 that are charge-available.

If the wireless charging stations 320 that are charge-available to the vehicle 100 while being at a standstill are identified, the corresponding wireless charging stations 320 are provided to the charging management device 101. Accordingly, when the vehicle 100 is stopped at intersections in which the identified wireless charging stations 320 are installed and is stopped at chargeable locations, the vehicle 100 receives power from the wireless charging stations 320.

The processor 150 receives, from BMS 122, SOC information or information used to calculate SOC. Further, the processor 150 determines a required amount of charge required for charging based on the received SOC or the calculated SOC. The determined required amount of charge may be transmitted to the server 200.

If charging is performed by receiving power from the wireless charging station 320, the processor 150 may update a required amount of charge based on the received power. In addition, the updated required amount of charge may be transmitted back to the server 200.

In addition, the processor 150 may calculate an estimated arrival time to each of the wireless charging stations 320 identified based on the current location, the traveling route, and the traveling speed of the vehicle 100. The processor 150 may transmit the calculated estimated arrival time to the server 200. The required amount of charge and the estimated arrival time transmitted to the server 200 may be transmitted to the charge control device 310 that controls each wireless charging station 320 as necessary.

On the other hand, although not illustrated, the charging management device 101 may include a global positioning system (GPS) device in order to determine the current location of the vehicle 100. The current location of the vehicle 100 determined by the GPS device may be transmitted from the charging management device 101 to the server 200 in real time or periodically. In addition, the charging management device 101 may determine the current location of the vehicle 100 in real time and may update the traveling route in real time or periodically based on the current location of the vehicle 100.

Figure 6:
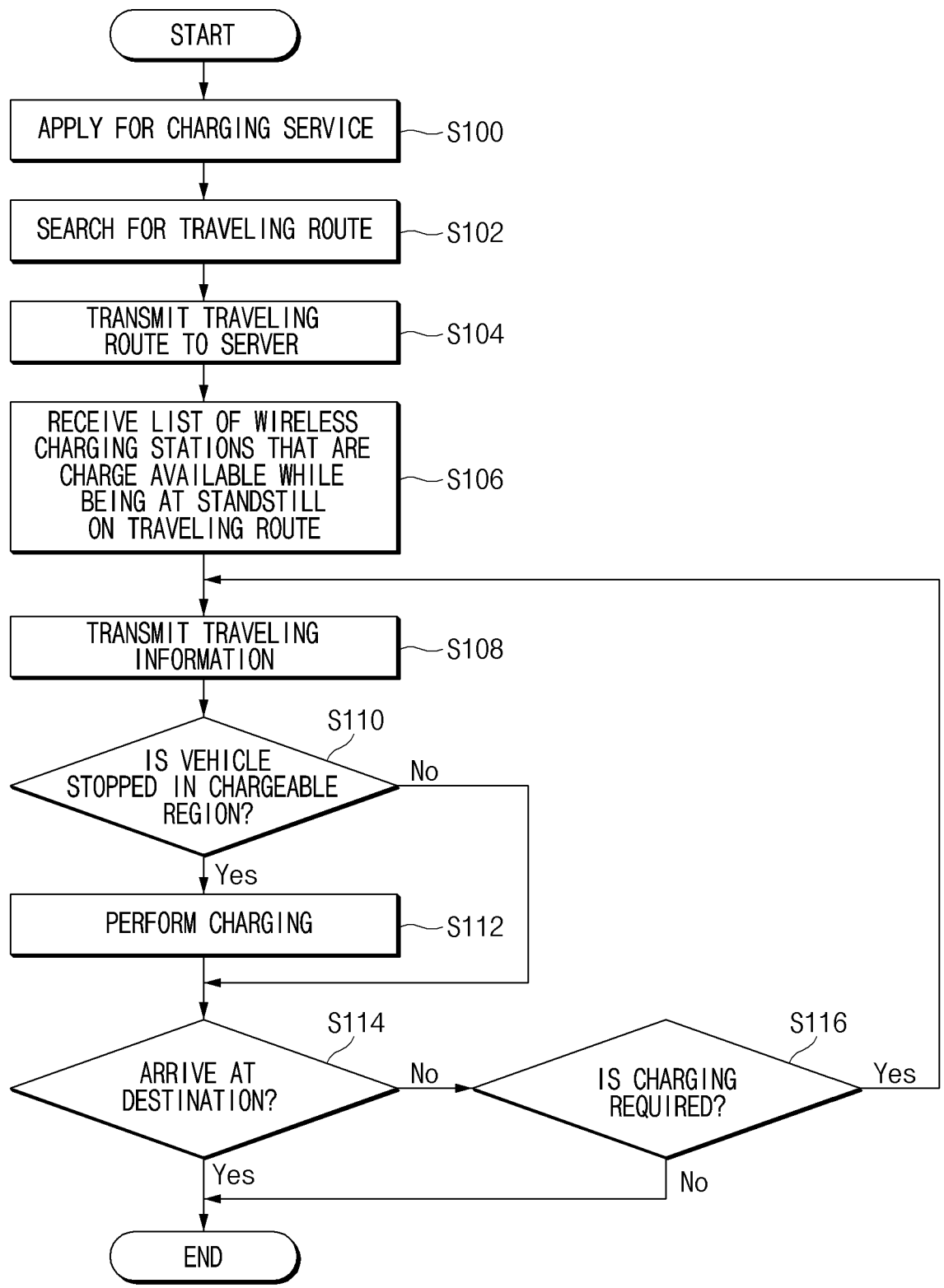
FIG. 6 is a flowchart illustrating an operation of the charging management device according to embodiments of the present disclosure.

FIG. 6 is a flowchart illustrating an operation of the charging management device according to embodiments of the present disclosure.

Referring to FIG. 6, the user may apply for a charging service capable of performing charging using the wireless charging system 300 on the road while the vehicle 100 is traveling (S100). The application for the charging service may be made immediately before traveling of the vehicle 100 by the user. Alternatively, the user may apply in advance to receive the charging service for the vehicle 100. In this case, the charging service may be automatically provided whenever traveling of the vehicle 100 is started. The application for the charging service may be made to the server 200.

The charging management device 101 searches for a traveling route if the user tries to move to the destination using the vehicle 100 (S102). The charging management device 101 may search for the traveling route based on the current location and destination of the vehicle 100. In addition, the charging management device 101 may directly search for the traveling route, but may also search for the traveling route in the navigation application of the user terminal or the server 200.

The traveling route determined based on the plurality of traveling routes searched is transmitted to the server 200 (S104). Of course, as described above, if the server 200 searches for the traveling route, the charging management device 101 may transmit, to the server 200, information on the current location and destination of the vehicle 100.

If the server 200 identifies the wireless charging stations 320 that are charge-available while being at a standstill on the traveling route based on the traveling route, the charging management device 101 receives a list of the identified wireless charging stations 320 (S106).

The vehicle 100 may travel toward the destination along the traveling route, and traveling information collected in this process may be transmitted to the server 200 by the charging management device 101 (S108). The traveling information may include information such as the current location and the traveling speed of the vehicle 100. In addition, the charging management device 101 may further transmit, along with the traveling information, information on a required amount of charge and the like calculated based on the SOC of the battery module 121, the traveling distance to the destination, or the like.

If the vehicle 100 is stopped by a stop signal at an intersection in traveling, determination is made as to whether the vehicle 100 has stopped in the chargeable region (S110). This determination may be performed by the charging management device 101 or may be performed by the wireless charging system 300. In addition, if the vehicle is stopped in the chargeable region and the wireless charging efficiency from the wireless charging station 320 to the battery module 121 is equal to or greater than a reference value, charging is performed (S112). Additionally, when the charging execution request is transmitted from the charging management device 101 of the vehicle 100 to the wireless charging system 300 before starting charging, charging may actually be started. That is, charging may be performed only when the user finally decides whether to perform charging, and the charging execution request requesting that charging be performed is transmitted from the charging management device 101 to the wireless charging system 300.

When charging the vehicle 100, the charging management device 101 may transmit identification information allowing the vehicle 100 to be identified, to the wireless charging station 320 that transmits power or the charge control device 310 that controls it. Alternatively, the charge control device 310 may include a device capable of recognizing the vehicle 100 such as a camera to identify the vehicle 100. Since the charge control device 310 secures identification information allowing the vehicle 100 to be identified, it will be possible to impose the electricity bill for power used for charging on the vehicle 100 in the future.

Steps S108 to S116 are repeated until the vehicle 100 arrives at the destination (Yes in S114) or until it is determined that charging of the battery module 121 is no longer required (No in S116).

In this way, it is possible to wirelessly charge the battery even if the vehicle 100 is temporarily stopped in traveling to the destination, thereby enabling efficient charging scheduling.

Figure 7:
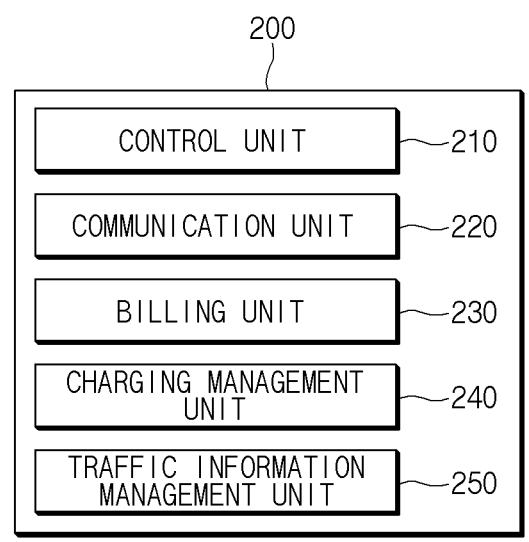
FIG. 7 is a block diagram illustrating a functional configuration of a server according to embodiments of the present disclosure.

FIG. 7 is a block diagram illustrating a functional configuration of the server according to embodiments of the present disclosure.

The server 200 is a server configured to provide a wireless charging service. In particular, the server 200 is a server for managing wireless charging of a vehicle on a road. Referring to FIG. 7, the server 200 may include a control unit 210, a communication unit 220, a billing unit 230, a charging management unit 240, and a traffic information management unit 250.

The control unit 210 controls operations of the communication unit 220, the billing unit 230, the charging management unit 240, and the traffic information management unit 250, which are components of the server 200. When the control unit 210 receives a traveling route from the charging management device 101, the control unit 210 identifies the wireless charging stations 320 that are charge-available to the vehicle 100 on the traveling route based on the received traveling route. If the control unit 210 receives information on the current location and destination instead of the traveling route from the charging device 101, the control unit 210 directly searches for the traveling route. Then, based on the traveling route searched, the wireless charging stations 320 are identified.

The communication unit 220 is a device configured to communicate with external devices based on the control of the control unit 210. The communication unit 220 may exchange information by communicating with the charging management device 101 of the vehicle 100 through the network 500. For example, the communication unit 220 may receive, from the charging management device 101, SOC information of the battery module 121, information on the required amount of charge, information and/or signals on the current location, the traveling route, the traveling speed, the charging execution request, or the like.

The communication unit 220 may also communicate with the wireless charging systems 300 through the network 500. The communication unit 220 may transmit the list of wireless charging stations 320 identified by the control unit 210 to the charging management device 101. In addition, the communication unit 220 may transmit information on the vehicle 100 to which the wireless charging service is provided, to the charge control device 310 that controls each of the identified wireless charging stations 320. For example, the communication unit 220 may transmit identification information for identifying the vehicle 100, the current location, the traveling speed, the traveling route, the required amount of charge of the vehicle 100, and the estimated arrival time it takes the vehicle 100 to arrive at the corresponding wireless charging station 320. Of course, instead of the information listed above being transmitted to the charge control device 310 by the communication unit 220, a part or all of the information may be directly transmitted to the charge control device 310 from the charging management device 101 of the vehicle 100.

The communication unit 220 may receive the estimated charging time and the available amount of charge of the vehicle 100 from the charge control device 310. The information as mentioned above may be transmitted before the vehicle 100 arrives at the wireless charging station 320 managed by the charge control device 310 or may be transmitted during charging. In addition, the communication unit 220 may receive the amount of power actually charged to the vehicle 100 from the charge control device 310. The amount of power may be a value corresponding to the amount of power transmitted to the vehicle 100 by the wireless charging station 320.

The billing unit 230 is configured to generate billing information based on information on the received amount of power. The billing unit 230 may generate billing information by associating identification information for identifying the vehicle 100 or the vehicle 100 transmitted from the user, payment method information, and the like, with information on the amount of power. The generated billing information may be transmitted to a payment server of a credit card company or the like to charge the electricity bill corresponding to the amount of power used to charge the battery module 121 of the vehicle 100.

The charging management unit 240 may receive, from a plurality of wireless charging systems 300, information on the estimated charging time and the charge-available amount of power of the vehicle 100 at each wireless charging station 320. In addition, the charging management unit 240 may calculate a total available charging time, a total chargeable amount of power, and the like based on the received information. Further, the charging management unit 240 may perform scheduling for charging of the vehicle 100 in traveling based on the received information, calculated information, or the like. At this time, the charging management unit 240 may receive information on traffic conditions from the traffic information management unit 250 and may perform scheduling for charging the vehicle 100 by reflecting the received information on traffic conditions.

The traffic information management unit 250 collects information on traffic conditions of the road. The information on traffic conditions may include information on an accident or construction, information on weather that affects the traffic flow, or the like, as well as the amount of movement of the vehicle. The traffic information management unit 250 may collect related information from an external agency (meteorological agency, CCTV of a road, government offices that manage the road, or the like).

Figure 8:
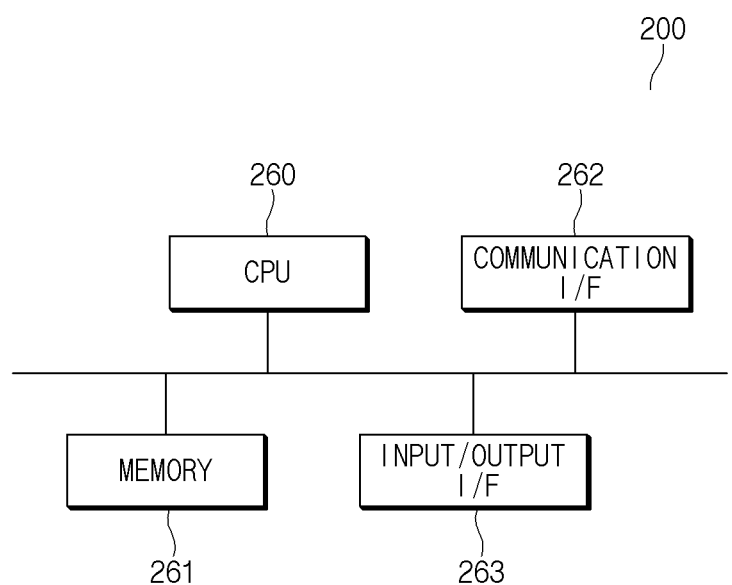
FIG. 8 is a block diagram illustrating a hardware configuration of the server according to embodiments of the present disclosure.

FIG. 8 is a block diagram illustrating a hardware configuration of the server according to embodiments of the present disclosure.

The server 200 including the control unit 210, the communication unit 220, the billing unit 230, the charging management unit 240, the traffic information management unit 250, and the like, may include at least one processor, at least one memory, a communication device, and the like in terms of hardware.

Referring to FIG. 8, the server 200 may include a processor (CPU) 260, a memory 261, a communication interface 262, an input/output interface 263, and the like.

The processor 260 is the at least one processor described above, and may be any of various controllers capable of performing an operation by executing computer program instructions such as a CPU, MCU, microcontroller, or microprocessor. The processor 260 may process various operations and arithmetic operations in the server 200 and may control each component.

The memory 261 may store the operating system program and a computer program for performing the functions of the control unit 210, the communication unit 220, the billing unit 230, the charging management unit 240, and the traffic information management unit 250. The memory 261 may include a volatile memory and a nonvolatile memory. For example, the memory 261 may be at least one of various storage media such as a semiconductor memory, for example, RAM, ROM, and flash memory, a magnetic disk, and an optical disk. The memory 261 may be a memory built into the processor 260 or may be an additional memory installed separately from the processor 260.

The communication interface 262 is configured to communicate with the outside by wire and/or wirelessly.

The input/output interface 263 performs input/output of various input signals and output signals.

The processor 260 may execute the program stored in the memory 261 to implement the module that performs the functions of the control unit 210, the billing unit 230, the charging management unit 240, and the traffic information management unit 250 of the server 200. The processor 260 may operate together with the communication interface 262 to function as the communication unit 220.

Specifically, the processor 260 as at least one processor executes computer program instructions stored in the memory 261 to perform operations for providing the wireless charging service. Specifically, the server 200 receives information on at least the traveling route and the current location of the vehicle from the vehicle 100 through the communication unit 220. Alternatively, instead of receiving the traveling route, the server may receive information on the current location and destination, and may directly search for the traveling route based on the received information. The server 200 may identify at least one wireless charging station 320 through which the vehicle 100 passes on the traveling route based on the received information on the traveling route and the current location of the vehicle. In addition, the server 200 provides information on the at least one identified wireless charging station 320 to the charging management device 101 of the vehicle 100.

The server 200 transmits the information on the vehicle 100 to a corresponding vehicle control device 310 that controls the at least one identified wireless charging station 320. The information on the vehicle 100 may include identification information for identifying the vehicle 100, the current location, the traveling route, the traveling speed, and the estimated arrival time of the vehicle 100, and the like.

In addition, the server 200 receives the amount of power charged in the battery module 121 of the vehicle 100 from the charge control device 310 in association with the identification information of the vehicle 100. Then, the server 200 may generate billing information for the vehicle 100 based on the received amount of power. An operation of generating the billing information may be generated based on the sum of all amounts of power received by the vehicle 100 on the traveling route.

Figure 9:
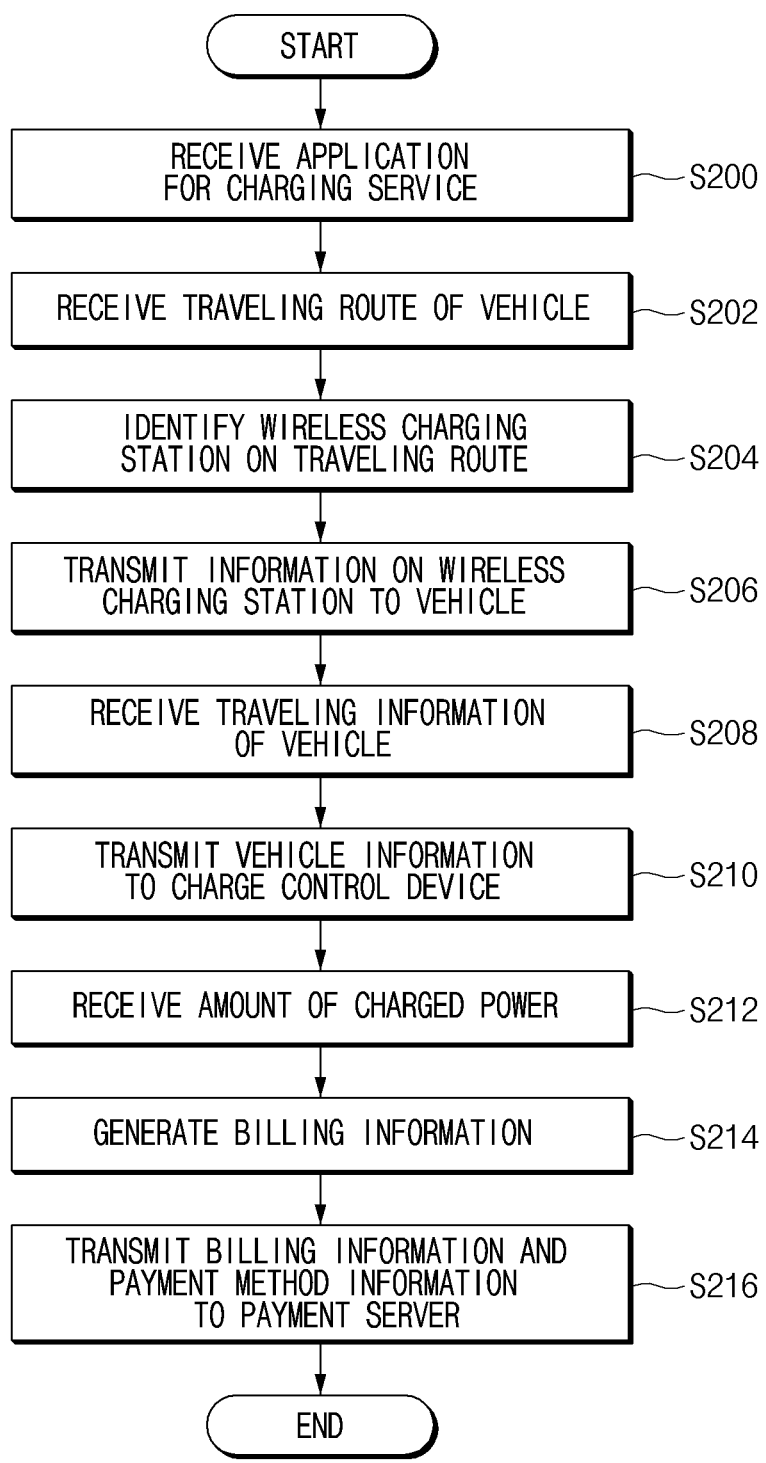
FIG. 9 is a flowchart illustrating an operation of the server according to embodiments of the present disclosure.

FIG. 9 is a flowchart illustrating an operation of the server according to embodiments of the present disclosure.

The server 200 receives the application for the charging service for the vehicle 100 from the user (S200). As described above, the application for the charging service may be made immediately before traveling of the vehicle 100 by the user. Alternatively, the user may apply in advance to receive the charging service for the vehicle 100. In this case, the charging service may be automatically provided whenever traveling of the vehicle 100 is started.

If the vehicle 100 is a vehicle which has applied for the charging service, the server 200 receives the traveling route from the vehicle 100 (S202). Alternatively, the server 200 directly searches for the traveling route by receiving information on the current location and destination of the vehicle 100.

The server 200 identifies at least one wireless charging station 320 that is charge-available to the vehicle 100 while being at a standstill on the traveling route based on the traveling route (S204). Information on the identified wireless charging station 320 is transmitted to the vehicle 100 (S206).

If the vehicle 100 starts traveling, the server 200 receives various traveling information from the vehicle 100 (S208). The traveling information received by the server 200 may include the current location and the traveling speed. In addition, the server 200 may receive, from the vehicle, information and/or signals such as the required amount of charge and SOC information.

The server 200 transmits a part or all of the received vehicle information to the charge control device 310 (S210). Then, the server 200 may receive, from the charge control device 310, the estimated arrival time at which the vehicle 100 is estimated to arrive at the wireless charging station 320, the chargeable amount of charge calculated based on the estimated arrival time, and the like, in real time or periodically while the vehicle 100 is traveling.

If the vehicle 100 starts from a specific wireless charging station 320 and gets out of the chargeable region, the server 200 receives the amount of charging power from the charge control device 310 (S212). Then, the server 200 generates billing information based on the received amount of charging power (S214). The billing information may include the amount of charging power, vehicle identification information, payment method information, and the like. If charging is completed in all the wireless charging stations 320 when the vehicle 100 arrives at the destination and the server 200 receives the amounts of charging power from the corresponding charge control devices 310, the server 200 may add all the received amounts of charging power to calculate the final amount of charging power to be charged.

The server 200 generates billing information based on the amount of power, and transmits it to the payment server to charge the electricity bill (S216).

In this way, it is possible to wirelessly charge the battery even if the vehicle 100 is temporarily stopped in traveling to the destination, thereby enabling efficient charging scheduling. In addition, the server 200 may create profit by charging vehicles traveling on the road.

Figure 10:
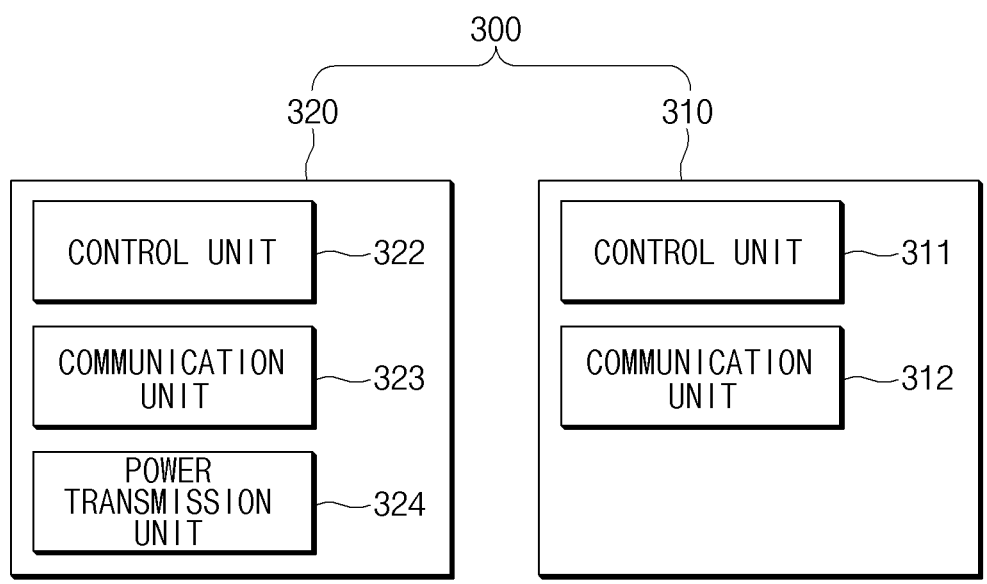
FIG. 10 is a block diagram illustrating a functional configuration of a wireless charging system according to embodiments of the present disclosure.

FIG. 10 is a block diagram illustrating a functional configuration of the wireless charging system according to embodiments of the present disclosure.

Referring to FIG. 10, the wireless charging system 300 includes the charge control device 310 and the wireless charging station 320.

The charge control device 310 may include a control unit 311 and a communication unit 312.

The communication unit 312 is a device configured to communicate with the server 200 and the wireless charging station 320 under the control of the control unit 311. In addition, through the communication unit 312, the charge control device 310 may receive signal information of the traffic lights 410 from the signal controller 400.

The control unit 311 is configured to control the operation of the wireless charging station 320. The control unit 311 is configured to control an operating state of the wireless charging station 320 based on vehicle information received from the server 200 and signal information of the traffic lights. The control unit 311 may receive, from the server 200, identification information for identifying the vehicle 100, location information indicating the current location of the vehicle, and the like, as the vehicle information.

The control unit 311 may receive, from the server 200, information such as the current location, the traveling route, and the traveling speed for the vehicle 100 that has applied for the charging service. The control unit 311 calculates the estimated arrival time at which the vehicle 100 arrives at the chargeable region 321 of the wireless charging station 320 based on the received information such as the current location, the traveling route, and the traveling speed. Then, the control unit 311 calculates an estimated charging time available to the vehicle 100 for charging in the same manner as described in FIG. 3.

The control unit 311 may receive the amount of power charged in the vehicle 100 from the wireless charging station 320. The control unit 311 may transmit, to the server 200, the received amount of power and vehicle information in association with each other. In this case, the control unit 311 may identify the vehicle 100 that has been stopped in the chargeable region 321 in order to confirm whether the vehicle 100 currently stopped in the chargeable region 321 of the wireless charging station 320 is the vehicle 100 transmitted from the server 200. For example, the charge control device 310 may identify the vehicle 100 by recognizing the license plate of the vehicle 100 through a camera or the like. Alternatively, the charge control device 310 may communicate with the charging management device 101 of the vehicle 100 or may communicate with a user device to identify the vehicle 100. Still alternatively, the wireless charging station 320 may communicate with the vehicle 100 to identify the vehicle 100, and the charge control device 310 may receive the result. If the vehicle 100 identified by the wireless charging system 300 matches the vehicle information transmitted from the server 200, the vehicle 100 may be charged.

The control unit 311 may be configured to control an operation state of the wireless charging station 320 such that the operation state thereof is switched from a sleep state to a standby state when the signal information of the traffic lights 410 indicates that the vehicle 100 is to be stopped in a traveling direction. In addition, the control unit 311 may be configured to control the wireless charging station 320 to stop power transmission before a signal for the vehicle traveling direction in the traffic lights 410 is changed from a stop signal to a go signal. Through this control, power consumption of the wireless charging station 320 may be minimized. In addition, power transmission may be stopped before the vehicle 100 starts, thereby preventing unnecessary waste of power.

The wireless charging station 320 is a facility on the road which is configured to wirelessly transmit power to the vehicle 100. The wireless charging station 320 may be installed under the ground of the road. A wireless power transmitting unit capable of wirelessly transmitting power is provided in a predetermined region under the ground of the road. When the vehicle 100 is stopped within a predetermined region, power may be wirelessly transmitted to the vehicle 100.

The wireless charging station 320 may include a control unit 322, a communication unit 323, and a power transmission unit 324.

The control unit 322 controls the operation of each component of the wireless charging station 320. The control unit 322 determines the location of the vehicle 100 when the vehicle 100 enters the intersection and stops in the chargeable region 321. If power is wirelessly transmitted to the vehicle 100, the control unit 322 determines whether the vehicle 100 is stopped at a location in which the power transmission rate is equal to or greater than the reference value. That is, the control unit 322 functions as a vehicle location determination device. The power transmission rate equal to or greater than the reference value may mean that the power transmission rate when power is wirelessly transmitted between the power transmission unit 324 and the wireless charging unit 130 is equal to or greater than the reference value. The power transmission rate may mean wireless charging efficiency indicating power charged in the battery module 121 of the vehicle 100, in the power transmitted from the power transmission unit 324.

The communication unit 323 is a device configured to exchange information and control signals with the vehicle 100, the charge control device 310, and the like.

The power transmission unit 324 corresponds to a wireless power transmission device that wirelessly transmits power to the vehicle 100. The power transmission method between the power transmission unit 324 and the wireless charging unit 130 may be implemented by various known methods, and is not limited to a specific method.

Meanwhile, if the power transmission unit 324 transmits power to the vehicle 100, the control unit 322 calculates the amount of power transmitted. That is, the control unit 322 functions as a power amount calculation unit.

The charging management device 101 may receive, from the wireless charging station 320, the amount of charging power, which is the amount of power which the wireless charging station 320 has transmitted to the vehicle 100. The charging management device 101 may provide the received amount of charging power to the server 200 together with the identification information of the vehicle 100 to generate the billing information.

Figure 11:
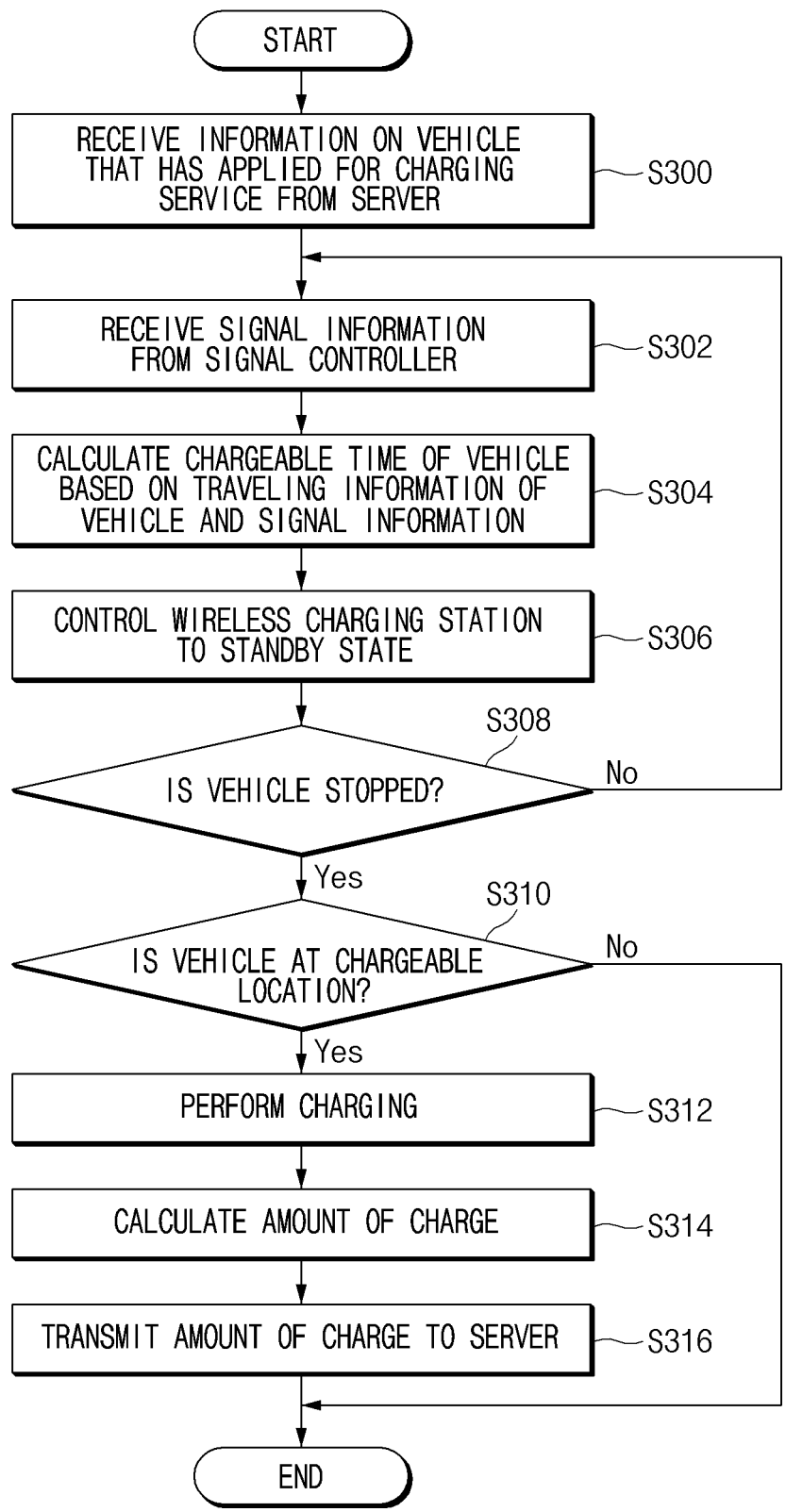
FIG. 11 is a flowchart illustrating an operation of the wireless charging system according to embodiments of the present disclosure.
Figure 12:
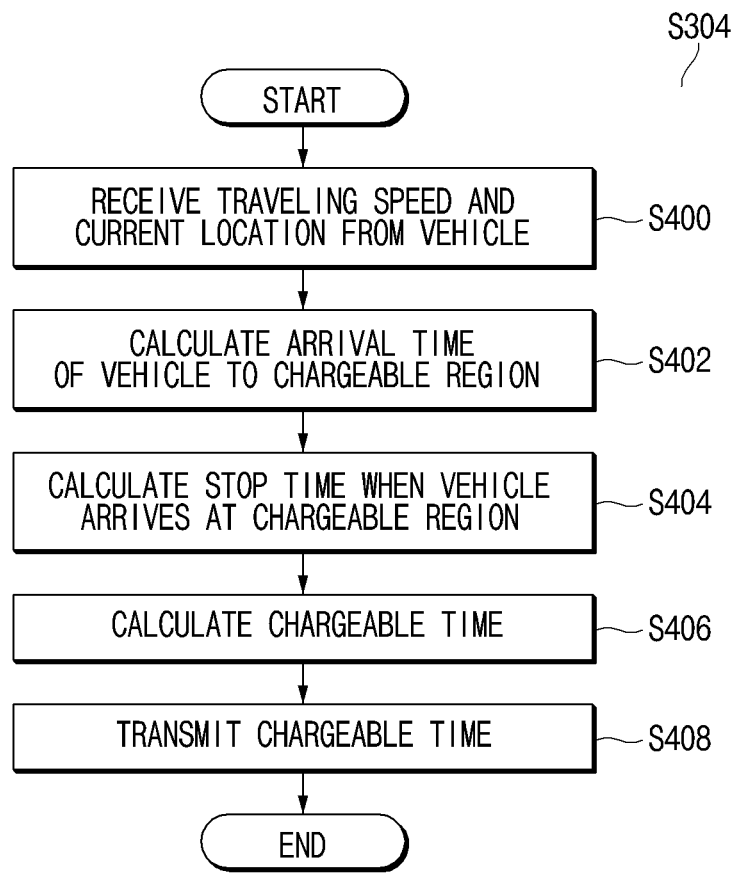
FIG. 12 is a flowchart illustrating a method for calculating an available charging time of a vehicle by the wireless charging system according to embodiments of the present disclosure.

FIG. 11 is a flowchart illustrating an operation of the wireless charging system according to embodiments of the present disclosure. FIG. 12 is a flowchart illustrating a method for calculating an available charging time of a vehicle by the wireless charging system according to embodiments of the present disclosure.

First, referring to FIG. 11, the charge control device 310 receives, from the server 200, information on the vehicle 100 that has applied for the charging service (3300). In addition, the charge control device 310 receives signal information from the signal controller 400 (S302). Based on the received information on the vehicle 100 and signal information, the charge control device 310 calculates a chargeable time of the vehicle 100 at the corresponding wireless charging station 320 (3304).

Here, referring to FIG. 12, a method for calculating the available charging time of the vehicle 100 is illustrated in detail. The charge control device 310 receives information such as the traveling speed and the current location from the server 200 (or alternatively the vehicle 100) (3400). Then, the time it takes for the vehicle 100 to arrive at the chargeable region is calculated (3402). Then, a stop time to be stopped when the vehicle 100 arrives at the chargeable region is calculated (S404). Based on the calculated stop time, the available charging time, that is, the estimated charging time is calculated (S406). The available charging time, which is the calculated estimated charging time, is transmitted to the server 200 or the vehicle 100 (S408). The method for calculating the estimated charging time of FIG. 12 has been described in detail with reference to FIG. 3, and thus further description will be omitted.

Referring back to FIG. 11, if the time when the vehicle 100 arrives at the chargeable region 321 is calculated, the charge control device 310 performs control such that the wireless charging station 320 switches from a sleep state to a standby state (S306). Then, determination is made as to whether the vehicle 100 is stopped at the wireless charging station 320 (S308). If the stopped vehicle is the vehicle that has applied for the charging service, determination is made as to whether the vehicle is stopped at the chargeable location (S310). That is, determination is made as to whether the power transmission rate is equal to or greater than the reference value.

If it is determined that the vehicle 100 is stopped at a chargeable location, charging is performed and power is wirelessly transmitted to the vehicle 100 (S312). The wireless charging station 320 calculates the amount of power transmitted to the vehicle 100 (S314), and transmits the amount of power to the server 200 for billing (S316).

In this way, it is possible to wirelessly charge the battery even if the vehicle 100 is temporarily stopped in traveling to the destination, thereby enabling efficient charging scheduling. In addition, the wireless charging system 300 may create profit by wirelessly transmitting power to vehicles that are stopped on the road in traveling.

That is, with the server 200 and the wireless charging system 300 according to embodiments of the present disclosure, it is possible to provide a wireless charging service that wirelessly charges the vehicle 100 while the vehicle 100 is at a standstill by using the plurality of wireless charging stations 320 provided under the ground of the road. The wireless charging service may include confirming, at the server 200, at least one wireless charging station available to make charging, among the plurality of wireless charging stations, based on a traveling route of the vehicle, transmitting power from the wireless charging station to the vehicle if the vehicle is stopped in a charging available position at an intersection in which the at least one wireless charging station is installed, and generating billing information based on an amount of power transmitted to the vehicle.

In the method for providing the service, the method may further include receiving payment method information from the vehicle, and transmitting payment information to a payment server based on the payment method information and the billing information. Here, the billing information may be generated based on vehicle information recognized by identifying a license plate of the vehicle.

In embodiments of the present disclosure, the wireless charging station 320 has been described as communicating with the server 200 through the charge control device 310; however, the present disclosure is not limited thereto. For example, the communication unit 323 of the wireless charging station 320 may directly communicate with the server 200 to receive at least some of the above-described information, and may transmit it to the charge control device 310.

Further, in FIG. 3, a configuration in which one charge control device 310 is connected to one wireless charging station 320 has been illustrated; however, the configuration is not limited thereto. For example, a configuration may be implemented in which a plurality of wireless charging stations 320 are installed at an intersection and one charge control device 310 controls the plurality of wireless charging stations 320.

Figure 13:
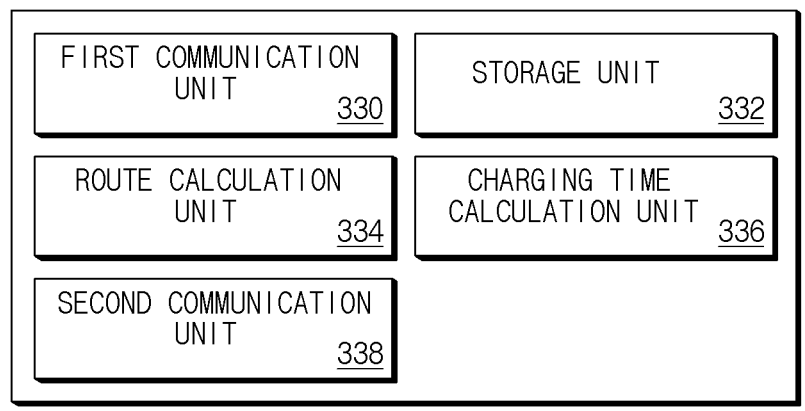
FIG. 13 is a block diagram illustrating another example of a functional configuration of a charge control device according to embodiments of the present disclosure.

FIG. 13 is a block diagram showing another example of a functional configuration of the wireless charging system according to embodiments of the present disclosure.

As an alternative embodiment, the wireless charging system 300 may include a first communication unit 330 that receives, from the vehicle 100, battery SOC information, a traveling speed, current location information, and destination information, current location information, and destination information, a route calculation unit 334 that calculates a route to the destination of the vehicle 100 using the current location information and the destination information, and a charging time calculation unit 336 that calculates the available charging time of the vehicle 100 using information on chargeable regions while waiting for a signal located on the route to the destination.

The first communication unit 330 further receives battery SOC information, traveling speeds, current location information, and destination information from a plurality of vehicles different from the vehicle 100. The charging time calculation unit 336 may calculate an available charging time of the vehicle 100 by further considering traveling speeds and current location information of a plurality of other vehicles.

The charging time calculation unit 336 calculates at least one chargeable region through which the vehicle 100 passes by using the route to the destination of the vehicle 100. Further, the charging time calculation unit 336 uses the distance from the current location of the vehicle 100 to the chargeable region and the traveling speed of the vehicle 100 to calculate the time it takes for the vehicle 100 to arrive at the chargeable region.

The charging time calculation unit 336 calculates the stop time when the vehicle 100 arrives at the chargeable region by using the stop-go signal period in the chargeable region and the time taken until the available charging time. In addition, the charging time calculation unit 336 may calculate the estimated charging time in the chargeable region of the vehicle 100 by using the stop time when the vehicle 100 arrives at the chargeable region and the current number of vehicles in the corresponding chargeable region.

The charging time calculation unit 336 calculates estimated charging times for all chargeable regions on the route to the destination of the vehicle 100. In addition, the charging time calculation unit 336 calculates the total charging time available while the vehicle 100 is traveling to the destination by adding all the estimated charging times in respective chargeable regions. The first communication unit 330 may transmit, to the vehicle 100, the calculated estimated charging time, estimated amount of charge, or total charging time for the vehicle.

The wireless charging system 300 may further include a second communication unit 338 for receiving a stop and go signal period in the chargeable region from the signal controller.

On the other hand, traffic conditions on the road may change from time to time. Due to factors such as accidents, construction, traffic jams, and an increase in the number of pedestrians, or the like, the available charging time calculated while the vehicle is traveling will change in real time. Accordingly, the charging time calculation unit 336 repeatedly calculates and updates the above charging time and the total available charging time based thereon in a predetermined period.

A storage unit 332 stores received SOC information, traveling speed, current location information, and destination information of each of the plurality of vehicles. In addition, the storage unit 302 stores equation information used to calculate the charging time of the vehicle. In addition, the storage unit 302 receives and stores signal change period information from a signal management device 50 located in a charging region 40 through the second communication unit 308.

Terms such as "include", "comprise", or "have" described above mean that the corresponding component can be present unless otherwise stated, and thus it should be construed that other components may be further included rather than excluding other components. All terms including technical or scientific terms may be construed as having the same meaning as commonly understood by those of ordinary skill in the art to which the embodiments of the present disclosure belong, unless otherwise defined. Terms commonly used such as those defined in dictionaries should be interpreted as having a meaning that is consistent with their meaning in the context of the related art and will not be interpreted in an idealized or overly formal sense unless expressly so defined in the present disclosure.

The above description is merely illustrative of the technical idea of the present invention, and those of ordinary skill in the art to which the present invention pertains will be able to make various modifications and variations without departing from the essential characteristics of the present invention. Accordingly, the embodiments disclosed in the present invention are not intended to limit the technical idea of the present invention, but to explain the technical idea, and the scope of the technical idea of the present invention is not limited by these embodiments. The scope of protection of the present invention should be interpreted by the accompanying claims, and all technical ideas within the scope equivalent thereto should be construed as being included in the scope of the present disclosure.

The invention claimed is:

1. A charging management device managing charging of a battery of a vehicle, the charging management device comprising:
   at least one processor;
   at least one memory that stores computer program instructions that, when executed, cause the at least one processor to perform operations;
   a communication device configured to communicate with a server; and
   a power receiving device configured to receive power wirelessly, wherein the operations include:
   searching for a vehicle traveling route at least based on a destination of the vehicle;
   identifying one or more wireless charging station that is charge-available while the vehicle is at a standstill based on the vehicle traveling route;
   determining whether the vehicle is stopped at a location of one or more chargeable position of the one or more wireless charging station, and whether the location of the one or more chargeable position has a power transmission rate equal to or greater than a reference value; and
   receiving power from the one or more wireless charging station when the vehicle is located in the one or more chargeable position of the one or more wireless charging station based on determination that the power transmission rate is equal to or greater than the reference value.

2. The charging management device of claim 1, wherein a list of the one or more wireless charging station that is charge-available is received from the server in response to transmitting the vehicle traveling route to the server.

3. The charging management device of claim 1, wherein the operations further include:
   determining an amount of charge required for charging the battery; and
   transmitting the amount of charge required for charging the battery to the server.

4. The charging management device of claim 3, wherein the operations further include:
   updating, when power is received from the one or more wireless charging station, the amount of charge required for charging the battery based on the received power: and
   transmitting the updated amount of charge to the server.

5. The charging management device of claim 1, wherein the operations further include:
   calculating an estimated arrival time to the one or more wireless charging station; and
   transmitting the calculated estimated arrival time to the server.

6. The charging management device of claim 1, wherein the operations further include transmitting a location of the vehicle to the server relative to the vehicle traveling route.

7. The charging management device of claim 1, wherein the one or more chargeable position of the one or more wireless charging station is located adjacent an intersection of a road.

8. A method for managing charging of a battery of a vehicle, the method comprising:
   searching for a vehicle traveling route at least based on a destination of the vehicle;
   identifying one or more wireless charging station that is charge-available while the vehicle is at a standstill based on the vehicle traveling route;
   determining whether the vehicle is stopped at a location of one or more chargeable position of the one or more wireless charging station, and whether the location of the one or more chargeable position has a power transmission rate equal to or greater than a reference value; and
   receiving power from the one or more wireless charging station when the vehicle is located in the one or more chargeable position of the one or more wireless charging station based on determination that the power transmission rate is equal to or greater than the reference value.

9. The method of claim 8, further comprising:
   transmitting the vehicle traveling route to the server; and
   receiving a list of the one or more wireless charging station that is charge-available from the server.

10. The method of claim 8, further comprising:
    determining an amount of charge required for charging the battery; and
    transmitting the amount of charge required for charging the battery to the server.

11. The method of claim 10, further comprising:
updating, when power is received from the one or more wireless charging station, the amount of charge required for charging the battery based on the received power; and
transmitting the updated amount of charge to the server.

12. The method of claim 8, further comprising:
calculating an estimated arrival time to the one or more wireless charging station; and
transmitting the calculated estimated arrival time to the server.

13. The method of claim 8, further comprising:
transmitting a location of the vehicle to the server relative to the vehicle traveling route.

14. The method of claim 8, wherein the one or more chargeable position of the one or more wireless charging station is located adjacent an intersection of a road.

* * * * *